(12) United States Patent
Lai et al.

(10) Patent No.: US 10,278,233 B2
(45) Date of Patent: Apr. 30, 2019

(54) COMMUNICATION APPARATUS AND COMMUNICATION METHOD

(71) Applicant: Toshiba Memory Corporation, Minato-ku (JP)

(72) Inventors: Yujen Lai, Kawasaki (JP); Yosuke Bando, Yokohama (JP); Kenichi Maeda, Kamakura (JP); Masahiro Ishiyama, Kawasaki (JP); Ren Sakata, Yokohama (JP); Hiroki Kudo, Kawasaki (JP); Takeshi Sakoda, Shinagawa (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 249 days.

(21) Appl. No.: 15/060,905

(22) Filed: Mar. 4, 2016

(65) Prior Publication Data
US 2017/0078344 A1    Mar. 16, 2017

Related U.S. Application Data

(60) Provisional application No. 62/216,866, filed on Sep. 10, 2015.

(51) Int. Cl.
| | |
|---|---|
| *H04W 76/40* | (2018.01) |
| *H04W 24/02* | (2009.01) |
| *H04L 1/00* | (2006.01) |
| *H04L 12/18* | (2006.01) |
| *H04L 12/24* | (2006.01) |
| *H04W 76/00* | (2018.01) |

(52) U.S. Cl.
CPC ........... *H04W 76/40* (2018.02); *H04L 1/0002* (2013.01); *H04L 12/1863* (2013.01); *H04W 24/02* (2013.01); *H04W 76/002* (2013.01); *H04L 12/18* (2013.01); *H04L 41/0816* (2013.01)

(58) Field of Classification Search
CPC .. H04W 76/002; H04W 24/02; H04L 1/0002; H04L 12/18; H04L 12/1863–12/1881; H04L 12/189; H04L 41/06; H04L 41/0816
See application file for complete search history.

(56) References Cited

U.S. PATENT DOCUMENTS

| | | | |
|---|---|---|---|
| 8,897,193 B2 | 11/2014 | Lee et al. | |
| 8,987,146 B2 | 3/2015 | Kirikihira et al. | |

(Continued)

FOREIGN PATENT DOCUMENTS

| | | |
|---|---|---|
| JP | 2013-187507 | 9/2013 |
| JP | 2013-187598 | 9/2013 |
| JP | 2014-216819 | 11/2014 |

*Primary Examiner* — Eric Myers
(74) *Attorney, Agent, or Firm* — Oblon, McClelland, Maier & Neustadt, L.L.P.

(57) ABSTRACT

According to one embodiment, a communication apparatus includes a radio interface unit that sends a data message to a receiver and extracts, when a message sent by the receiver via unicast with an optimized transmission rate is received, rate information indicating the optimized transmission rate of the receiver from the received message, a message processor that generates the data message, in which a multicast identifier indicating a multicast group is a destination, and outputs the data message to the radio interface unit, and a selector that selects, according to the rate information, a data message transmission rate to send the data message.

18 Claims, 12 Drawing Sheets

(56) References Cited

U.S. PATENT DOCUMENTS

| | | | |
|---|---|---|---|
| 2012/0051350 A1* | 3/2012 | Kim | H04W 84/12 |
| | | | 370/338 |
| 2012/0051403 A1* | 3/2012 | Jung | H04W 84/047 |
| | | | 375/211 |
| 2014/0254464 A1 | 9/2014 | Ponnuswamy | |
| 2015/0214030 A1 | 7/2015 | Kirikihira et al. | |

\* cited by examiner

FIG.2

| TRANSMISSION SOURCE PUBLISHER IDENTIFIER | TRANSMISSION DESTINATION MULTICAST GROUP IDENTIFIER | NUMBER OF CHUNKS | CHUNK 1 | CHUNK 2 | ... |

FIG.3

| TRANSMISSION SOURCE SUBSCRIBER IDENTIFIER | TRANSMISSION DESTINATION PUBLISHER IDENTIFIER | NUMBER OF CHUNK IDENTIFIERS | CHUNK IDENTIFIER 1 | CHUNK IDENTIFIER 2 | ... |

FIG.10

Selected Rate

| Best Rate | $R_1$ | $R_2$ | $R_3$ | $R_4$ | $R_5$ | $R_6$ | $R_7$ | $R_8$ | $R_9$ | $R_{10}$ | ... | $R_k$ |
|---|---|---|---|---|---|---|---|---|---|---|---|---|
| $R_1$ | $T_{1,1}$ | $T_{1,2}$ | $T_{1,3}$ | $T_{1,4}$ | $T_{1,5}$ | $T_{1,6}$ | $T_{1,7}$ | $T_{1,8}$ | $T_{1,9}$ | $T_{1,10}$ | ... | $T_{1,k}$ |
| $R_2$ | $T_{2,1}$ | $T_{2,2}$ | $T_{2,3}$ | $T_{2,4}$ | $T_{2,5}$ | $T_{2,6}$ | $T_{2,7}$ | $T_{2,8}$ | $T_{2,9}$ | $T_{2,10}$ | ... | $T_{2,k}$ |
| $R_3$ | $T_{3,1}$ | $T_{3,2}$ | $T_{3,3}$ | $T_{3,4}$ | $T_{3,5}$ | $T_{3,6}$ | $T_{3,7}$ | $T_{3,8}$ | $T_{3,9}$ | $T_{3,10}$ | ... | $T_{3,k}$ |
| $R_4$ | $T_{4,1}$ | $T_{4,2}$ | $T_{4,3}$ | $T_{4,4}$ | $T_{4,5}$ | $T_{4,6}$ | $T_{4,7}$ | $T_{4,8}$ | $T_{4,9}$ | $T_{4,10}$ | ... | $T_{4,k}$ |
| $R_5$ | $T_{5,1}$ | $T_{5,2}$ | $T_{5,3}$ | $T_{5,4}$ | $T_{5,5}$ | $T_{5,6}$ | $T_{5,7}$ | $T_{5,8}$ | $T_{5,9}$ | $T_{5,10}$ | ... | $T_{5,k}$ |
| $R_6$ | $T_{6,1}$ | $T_{6,2}$ | $T_{6,3}$ | $T_{6,4}$ | $T_{6,5}$ | $T_{6,6}$ | $T_{6,7}$ | $T_{6,8}$ | $T_{6,9}$ | $T_{6,10}$ | ... | $T_{6,k}$ |
| $R_7$ | $T_{7,1}$ | $T_{7,2}$ | $T_{7,3}$ | $T_{7,4}$ | $T_{7,5}$ | $T_{7,6}$ | $T_{7,7}$ | $T_{7,8}$ | $T_{7,9}$ | $T_{7,10}$ | ... | $T_{7,k}$ |
| $R_8$ | $T_{8,1}$ | $T_{8,2}$ | $T_{8,3}$ | $T_{8,4}$ | $T_{8,5}$ | $T_{8,6}$ | $T_{8,7}$ | $T_{8,8}$ | $T_{8,9}$ | $T_{8,10}$ | ... | $T_{8,k}$ |
| $R_9$ | $T_{9,1}$ | $T_{9,2}$ | $T_{9,3}$ | $T_{9,4}$ | $T_{9,5}$ | $T_{9,6}$ | $T_{9,7}$ | $T_{9,8}$ | $T_{9,9}$ | $T_{9,10}$ | ... | $T_{9,k}$ |
| $R_{10}$ | $T_{10,1}$ | $T_{10,2}$ | $T_{10,3}$ | $T_{10,4}$ | $T_{10,5}$ | $T_{10,6}$ | $T_{10,7}$ | $T_{10,8}$ | $T_{10,9}$ | $T_{10,10}$ | ... | $T_{10,k}$ |
| ⋮ | ⋮ | ⋮ | ⋮ | ⋮ | ⋮ | ⋮ | ⋮ | ⋮ | ⋮ | ⋮ | ... | ⋮ |
| $R_k$ | $T_{k,1}$ | $T_{k,2}$ | $T_{k,3}$ | $T_{k,4}$ | $T_{k,5}$ | $T_{k,6}$ | $T_{k,7}$ | $T_{k,8}$ | $T_{k,9}$ | $T_{k,10}$ | ... | $T_{k,k}$ |

COMMUNICATION APPARATUS AND COMMUNICATION METHOD

CROSS-REFERENCE TO RELATED APPLICATIONS

This application is based upon and claims the benefit of priority from U.S. Provisional Application No. 62/216,866, filed on Sep. 10, 2015; the entire contents of which are incorporated herein by reference.

FIELD

Embodiments described herein relate generally to a communication apparatus and a communication method.

BACKGROUND

In the case where a transmission terminal sends the same data to a plurality of reception terminals in a radio communication, when the transmission terminal sends the data to the individual reception terminals via unicast, it takes much time and the power is consumed. On the other hand, when the transmission terminal simultaneously sends the data to the reception terminals via multicast, it is possible to efficiently send the data.

BRIEF DESCRIPTION OF THE DRAWINGS

FIG. 2 is a diagram illustrating a configuration example of a radio interface including a plurality of radio devices;

FIG. 3 is a diagram illustrating an example of message transmission;

FIG. 10 is a diagram illustrating an example of an RT-table of the first embodiment;

DETAILED DESCRIPTION

In general, according to one embodiment, a communication apparatus includes a radio interface unit that sends a data message to a receiver and extracts, when a message sent by the receiver via unicast with an optimized transmission rate is received, rate information indicating the optimized transmission rate of the receiver from the received message. Furthermore, the communication apparatus includes a message processor that generates the data message, in which a multicast identifier indicating a multicast group is a destination, and outputs the data message to the radio interface unit, and a selector that selects, according to the rate information, a data message transmission rate to send the data message.

Exemplary embodiments of a communication apparatus and a communication method will be explained below in detail with reference to the accompanying drawings. The present invention is not limited to the following embodiments.

(First Embodiment)

Figure 1:
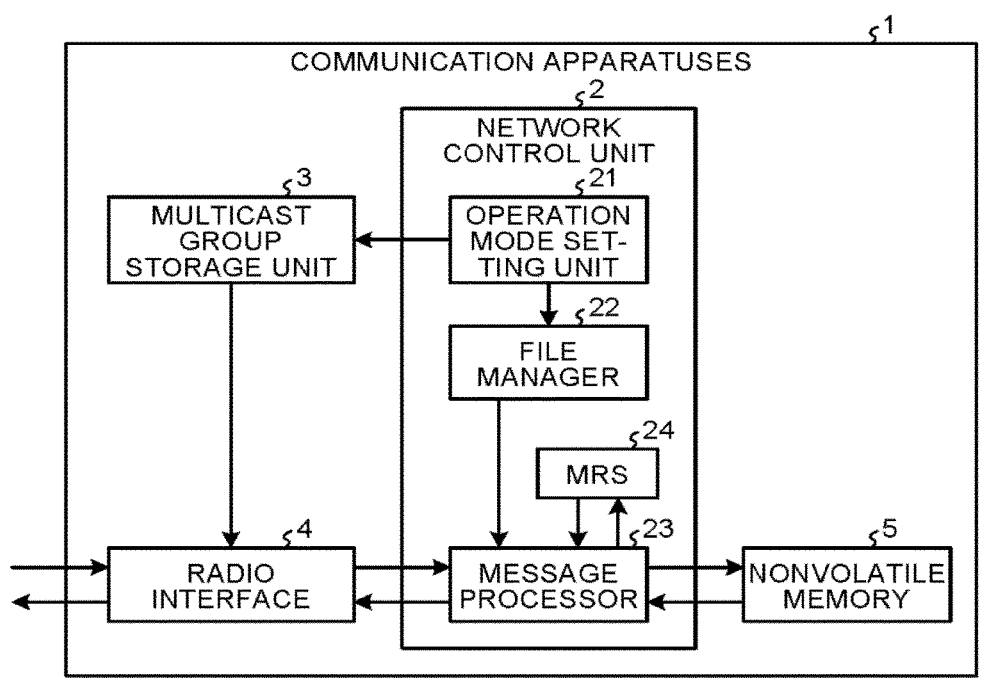
FIG. 1 is a block diagram illustrating a configuration example of a communication apparatus according to a first embodiment.

FIG. 1 is a block diagram illustrating a configuration example of a communication apparatus 1 according to a first embodiment. The communication apparatus 1 includes a network control unit 2, a multicast group storage unit 3, a radio interface 4 (radio interface unit), and a nonvolatile memory 5.

The radio interface 4 performs a reception process of a radio signal according to a communication protocol, and when the received signal is a message which is addressed to the communication apparatus 1, the radio interface 4 outputs the message to the network control unit 2. Furthermore, the radio interface 4 sends, according to the communication protocol, a message generated by the network control unit 2 as the radio signal.

Any protocol can be used as the communication protocol, and an Internet protocol (IP) can be used as the communication protocol of, for example, a layer 3, that is, a network layer. Furthermore, a protocol based on the institute of electrical and electronics engineers (IEEE) 802.11 can be used as the communication protocol of a layer 1 and a layer 2, that is, a physical layer and a data link layer. Although the communication protocol of the layer 1 and the layer 2 is not limited to the IEEE802.11, it is assumed that the protocol supports a plurality of transmission rates and has a function called rate adaptation (or link adaptation) in which an optimal transmission rate is selected among a plurality of the transmission rates. Specific algorithm of the rate adaptation has no restriction, and, for example, an automatic rate fallback (ARF) algorithm or a method where the reception side measures the quality of the radio signal by using a request to send (RTS) frame can be used. Furthermore, it is assumed that the transmission rate is stored in the headers of the layer 1 and the layer 2 (for example, a physical layer convergence protocol (PLCP) header that is the header of the layer 1) in which the sent message is stored.

The communication apparatus 1 of the present embodiment can send and receive the data to and from another communication apparatus 1 which has a similar configuration via a communication in an infrastructure mode or in an ad hoc mode. In the infrastructure mode, the communication apparatus 1 functions as an access point or a terminal, and when the communication apparatus 1 functions as the terminal, the communication apparatus 1 communicates with the access point and with the other communication apparatus 1 through the access point. In the ad hoc mode, the communication apparatus 1 directly communicates with the other communication apparatus 1. The communication apparatus 1 can perform the unicast communication with the other communication apparatus 1 and send the same data to a plurality of other communication apparatuses 1 via the multicast.

However, when the communication apparatus 1 functions as the terminal in the infrastructure mode, the message sent by the communication apparatus 1 via the multicast is actually sent to the other communication apparatus 1 that functions as the access point as a message via the unicast. Thereafter, the other communication apparatus 1 that functions as the access point sends the above message via the multicast.

The multicast group storage unit 3 holds a list of an identifier of a multicast group to which the communication apparatus 1 belongs. The multicast group storage unit 3 notifies the radio interface 4 of the identifier of the multicast group to which the communication apparatus 1 belongs. The radio interface 4 determines whether the message, in which the destination includes the multicast address corresponding to the identifier of the multicast group to which the communication apparatus 1 belongs, is addressed to the communication apparatus 1. The nonvolatile memory 5 holds the data to be sent or the received data. The network control unit 2 includes an operation mode setting unit 21, a file manager 22, a message processor 23, and a multicast rate selector (MRS) 24 (selector).

To exchange the data between mobile devices, it is required to send the same data to a plurality of terminals some times. In this case, the data is to be transferred from one to many. If the communication efficiency is not considered, it is considered that a one to one communication is repeated the number of times of the reception terminals. However, it is redundant to repeatedly send the same data, the time required to transfer the data is increased, and the frequency band is unnecessarily occupied for a long time.

To avoid this, the multicast communication that is the one to many communication is used instead of the unicast communication that is the one to one communication. However, in the case of the multicast communication, when a reception terminal misses a particular data fragment, the data transfer of the transmission terminal cannot be suspended to perform a retransmission process only for the reception terminal. Although the digital television broadcast, the IP broadcast, or the like does not include the data retransmission mechanism, this is because that the media data to be sent has a data structure which prevents a failure of the process even if a particular data area is missed. When data of an arbitrary format is considered, a bit of a reception file should not be missed. Consequently, in the present embodiment, the retransmission process is performed to avoid the data from missing on the reception side while the data is sent via the multicast communication. The details of the retransmission process will be described later.

Furthermore, in the case where the multicast communication is performed, there is a problem that the transmission rate cannot be optimized. Generally, in the unicast communication, the transmission rate is optimized by the rate adaptation performed in the layers below the layer 2. However, in the multicast communication, the rate adaptation is not performed and the transmission rate is not optimized, and the multicast communication is performed with, for example, the lowest transmission rate. In the present embodiment, in order to appropriately set the transmission rate in the multicast communication, the MRS 24 that selects and sets the transmission rate is provided. The method for setting the transmission rate will be described later.

In the present embodiment, when the same data is sent to the other communication apparatuses 1, the transmission and reception of the data is managed by using the multicast group. The multicast group belongs the same logical network and, is an assembly of the communication apparatuses 1 between which the data is sent and received. In the present embodiment, the logical network is consisted of the communication apparatuses that have the same multicast identifier. In other words, the data to be distributed in the multicast group is sent and received between the communication apparatuses that have the same multicast identifier, and the data to be distributed in the multicast group is not sent and received between the communication apparatuses that do not have the same multicast identifier even if the communication apparatuses are physically adjacent to each other. In the present embodiment, the communication apparatus 1 that is the transmission source of the data when the same data is sent to the other communication apparatuses 1, that is, a transmission source apparatus is referred to as a publisher (transmission source) or a sender, and the communication apparatus 1 other than the publisher is referred to as a subscriber (reception side) or a receiver. The subscriber receives the data directly from the publisher or through another communication apparatus 1. A communication apparatus 1 that becomes the publisher is set to a multicast group.

In the case based on the assumption of the infrastructure mode, the publisher is the communication apparatus 1 that functions as the access point, and the subscriber is the communication apparatus 1 that functions as the terminal. In the case based on the assumption of the ad hoc mode, the publisher and the subscriber each are an arbitrary communication apparatus 1.

Returning back to the description of FIG. 1, the operation mode setting unit 21 (operation mode storage unit) of the network control unit 2 sets the communication apparatus 1 to operate in which mode of the publisher or the subscriber. Furthermore, the operation mode setting unit 21 sets the multicast group to which the communication apparatus 1 belongs. The multicast group setting will be described later. The operation mode can be set for each multicast group. In the case of the ad hoc mode, a communication apparatus 1 can be set so as to be the publisher in a certain multicast group or to be the subscriber in another multicast group. The operation mode setting unit 21 controls the file manager 22 and the message processor 23 so that the individual multicast groups operates according to the operation mode.

When the communication apparatus 1 operates as the publisher, the file manager 22 generates a table of contents (ToC) (content information) of a file group to be sent to the subscriber. In the present embodiment, a cluster of data to be sent from the publisher to the subscriber is referred to as a file. The file may be any kind of data file. For example, the file may be a text file, or an image or video data file. The publisher sends one or more files with a series of messages. The file manager 22 generates the ToC storing the information on the file corresponding to the series of messages before the series of messages is sent. Furthermore, the file manager 22 divides the file into unit data that is called chunk (data chunk) and used to perform the retransmission, and assigns a unique identifier to the individual chunks. The ToC includes the identifier of the file and the list of the chunks constituting the file for each file. The list of the chunks constituting the file is, for example, the list of the identifiers of the chunks. The list of the chunks constituting the file (hereinafter, referred to as a chunk list) is not limited to this and may be information indicating the range of the identifiers of the chunk to be sent when the identifiers of the consecutive chunks are assigned to a file. The message processor 23 generates a message storing the ToC (ToC message). The radio interface 4 sends the ToC message as the radio signal.

When the communication apparatus 1 operates as the subscriber, the file manager 22 holds the chunk list notified by the ToC.

The message processor 23 generates the message, in which the data to be sent to the other communication apparatus 1 is formed to a fixed format, and pass the message to the radio interface 4. Furthermore, the radio interface 4 receives the message received from the other communication apparatus 1 and performs the process according to the message.

When the communication apparatus 1 operates as the publisher, the message processor 23 generates the data message storing the data held in the nonvolatile memory 5 (the data constituting the file). Furthermore, when the communication apparatus 1 operates as the publisher, the message processor 23 performs the retransmission process, which will be described later, based on a repair message, which will be described later, received from the subscriber. Although an example where the publisher sends the data held in the nonvolatile memory 5 to the subscriber will be explained in the description, the present embodiment can be applicable when the data received via a wired or wireless line, or the data stored in another external storage medium is sent. Furthermore, when the communication apparatus 1 operates as the publisher, the message processor 23 receives the repair message from the radio interface 4 and outputs the repair message to the MRS 24.

When the communication apparatus 1 operates as the subscriber, the message processor 23 extracts the data from the data message received from the other communication apparatus 1 and stores the data in the nonvolatile memory 5. When the ToC is received, the message processor 23 holds the chunk list stored in the ToC. Furthermore, when the communication apparatus 1 operates as the subscriber, the message processor 23 generates the repair message and passes the repair message to the radio interface 4 if there is a data message which the subscriber has failed to receive.

The data message is the message including the chunk that is the fragment of the file data to be sent from the publisher to the subscriber. A data message includes one or more chunks. A chunk is constituted of a byte stream that is the original of the chunk and the identifier of the chunk. In addition, the chunk may include other information.

When the size of the chunk is too big to be sent as a data message, the chunk may be divided into smaller unit data called a sector. In this case, the data message is sent in sector unit, and the retransmission request is performed in chunk unit. In this case, the data message includes one or more sectors. The sector is constituted of a byte stream that is the original of the sector and the identifier of the sector. The identifier of the sector is constituted of a pair of the identifier of the chunk including the sector and the index from the first in the chunk including the sector. The publisher also divides the ToC into the chunks or the sectors and sends the divided ToC as the data message similarly to the file data.

When the communication apparatus 1 operates as the publisher, the MRS 24 selects, based on the repair message received from the other communication apparatus 1 that functions as the subscriber, the transmission rate of the multicast transmission and notifies the message processor 23 of the selected transmission rate. When the message processor 23 generates the message to be sent via the multicast transmission, such as the data message, the message processor 23 instructs the radio interface 4 to perform the transmission with the transmission rate notified by the MRS 24. Thus, the transmission rate of the multicast transmission is set. When the communication apparatus 1 operates as the subscriber, the MRS 24 does not operate.

Although the example where the communication apparatus 1 has both functions of the publisher and the subscriber has been explained in the above description, the operations of the present embodiment can be applicable even when the communication apparatus 1 has either function of the publisher or the subscriber. In this case, the communication apparatus 1 that has only a function of the publisher does not need to include the operation mode setting unit 21 of FIG. 1, and the individual constituent elements perform the operations when the communication apparatus 1 operates as the above described publisher. The communication apparatus 1 that has only a function of the subscriber does not need to include the operation mode setting unit 21 and the MRS 24 of FIG. 1, and the individual constituent elements perform the operations when the communication apparatus 1 operates as the above described subscriber. In the present embodiment, the communication apparatus 1 that has both functions of the publisher and the subscriber and operates as the publisher, and the communication apparatus 1 that has only a function of the publisher are referred to as the publisher, and the communication apparatus 1 that has both functions of the publisher and the subscriber and operates as the subscriber, and the communication apparatus 1 has only a function of the subscriber are referred to as the subscriber.

FIG. 2 is a diagram illustrating a configuration example of the data message of the present embodiment. FIG. 2 illustrates an example where the data message is sent in chunk units. As illustrated in FIG. 2, a publisher identifier of the transmission source as the information indicating the transmission source and a multicast group identifier of the transmission destination as the information indicating the destination are stored in the data message. Subsequently, the chunk number indicating the number of chunks to be sent in the data message is stored and then the chunks (chunk 1, chunk 2, and the like) are stored. When the data message is sent in sector units, the chunk number of FIG. 2 is changed to the sector number, and the sectors are stored instead of the chunks.

The repair message is the message to be sent from the subscriber to the publisher. The repair message is used by the subscriber to instruct the publisher to send, that is, resend the chunk. The repair message includes the chunk identifier of the chunk that the subscriber requests to resend. When the publisher receives the repair message, the publisher sends the chunk corresponding to the chunk identifier included in the repair message at a particular timing as the retransmission process.

FIG. 3 is a diagram illustrating a configuration example of the repair message of the present embodiment. The repair message is constituted of the list of the identifiers of the chunks that the subscriber requests to send. As illustrated in FIG. 3, the subscriber identifier of the transmission source as the information indicating the transmission source and the publisher identifier of the transmission destination as the information indicating the destination are stored in the repair message. In other words, the repair message is sent to the publisher which is the destination via the unicast. Subsequently, the chunk identifier number indicating the number of chunk identifiers of the chunks that the subscriber requests to send in the repair message is stored and then the identifiers of the individual chunks that the subscriber requests to send is stored. In order to reduce the data amount of the chunk identifiers specified in the repair message, the data amount may be compressed with a method where the identifiers of the consecutive chunks included in the same file is indicated by a pair of the identifier of the first chunk and the number of consecutive chunks. When the communication apparatus 1 operates in the infrastructure mode, the subscriber may store the multicast group identifier in the information indicating the destination. In this case, since the destination is the multicast group identifier, but the multicast transmission is performed via the publisher, the repair message is sent to the publisher via the unicast. The transmission via the unicast (unicast transmission) in the description includes the multicast transmission that is the transmission from the subscriber to the publisher in the infrastructure mode.

Next, the multicast group of the present embodiment will be explained. In the present embodiment, the publisher sends the data message via the multicast, and participates in the same multicast group, and all apparatuses within the radio wave reachable range receive the data message. When a normal message is sent via the multicast, the apparatus as the transmission source does not ensure that the message correctly reaches the apparatus on the reception side neither confirm whether or not the message has reached the apparatus. On the other hand, when the apparatus has failed to receive the data message in the present embodiment, the retransmission process is performed using the repair message. In this manner, by performing the retransmission process, it is possible to avoid the data from missing on the reception side even when the data is sent via the multicast.

Figure 4:
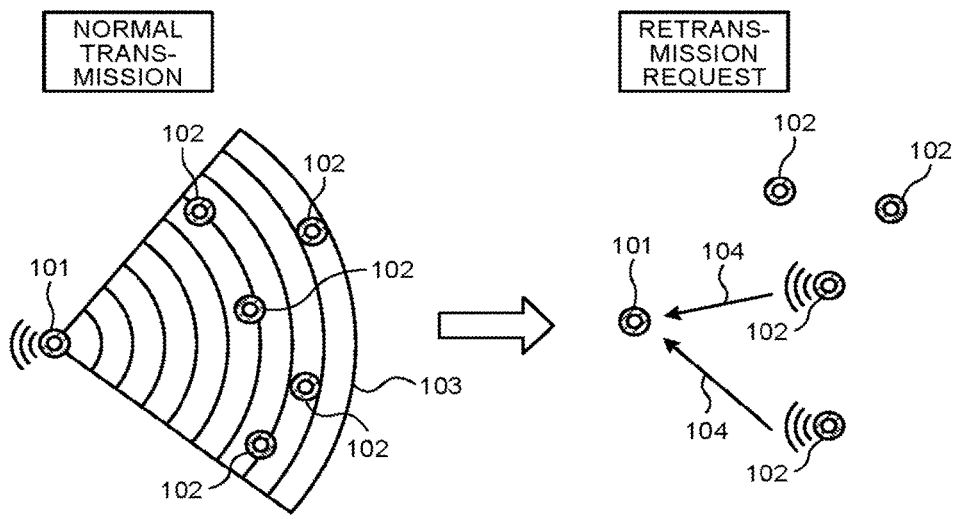
FIG. 4 is a diagram illustrating a configuration example of a first notification signal of the first embodiment.

FIG. 4 is a diagram illustrating an example of the message transmission of the present embodiment. The normal transmission on the left illustrates that a publisher 101 sends the data message via the multicast. A subscriber 102 within a reachable range 103 of the radio wave from the publisher 101 can receive the data message. The retransmission request on the right illustrates that the subscriber 102 requests the retransmission by a repair message 104. The radio wave output from the publisher 101 and the subscriber 102 may have or may not have a directivity. When the radio wave does not have the directivity, the radio wave output from the publisher 101 and the subscriber 102 concentrically propagates in FIG. 4.

As an example of the transmission via the multicast, there is a method where the IP multicast is used. A common multicast address is assigned to the publisher participating in the same multicast group and all of the subscribers. In this case, a multicast address can be used as the identifier of the multicast group of FIG. 2. When a message addressed to the multicast address is sent, the message reaches all of the apparatuses in the same multicast group. On the other hand, if an apparatus which participates in a different multicast group exists nearby, the multicast address is different and each other's message does not reach the wrong apparatus.

Figure 5:
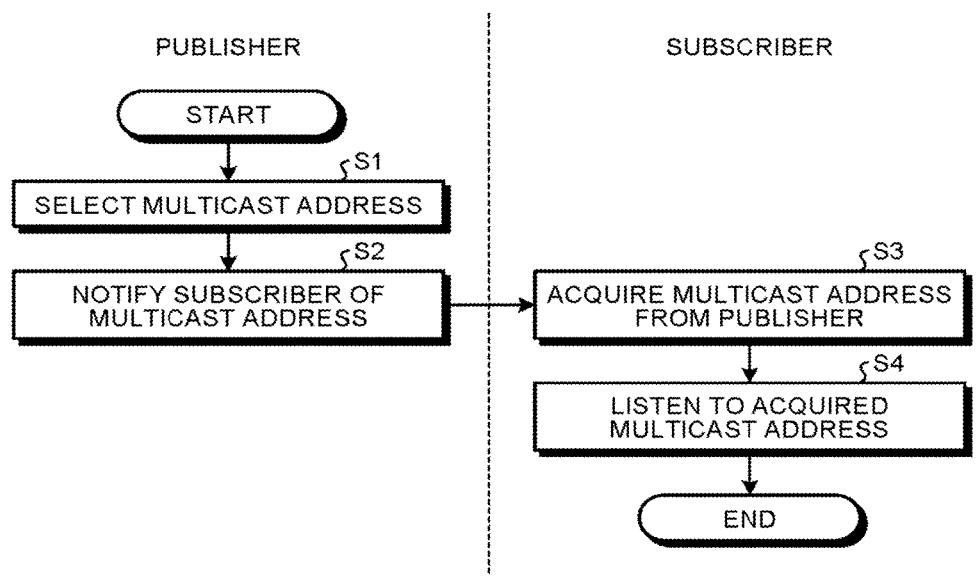
FIG. 5 is a diagram illustrating an example of a process procedure of a state transition from a terminal mode to a radio base station mode.

FIG. 5 is a diagram illustrating an example of a participation process procedure to the multicast group. To generate a new multicast group, first, the publisher selects the multicast address (step S1). The multicast group storage unit 3 selects the multicast address. The multicast address is used as the identifier of the multicast group so that another apparatus receives the file sent by the communication apparatus 1. Next, the publisher notifies the surrounding apparatuses (the subscribers) of the multicast address by any method (step S2). For example, all of the communication apparatuses 1 which can participate in the multicast group are connected to the network having a common network address in advance, and the method for notifying the network address of the multicast address via the broadcast is considered. Alternatively, a physical method independent of the network, such that an administrator of the publisher verbally notifies a user of the subscriber of the multicast address may be used. Alternatively, the publisher does not decide the multicast address, but an operator may determine the multicast address and sets the address to the publisher, and the operator may notify the user of the multicast address via a paper or an e-mail.

The subscriber acquires the multicast address by the input from the user or the reception from the publisher (step S3). When the subscriber receives the file from the publisher in the multicast group, the subscriber starts to listen (receive the data sent in the multicast group) by setting the multicast address (step S4). Specifically, the multicast group storage unit 3 of the subscriber holds the multicast address. Furthermore, the multicast group storage unit 3 of the publisher also holds the decided or set multicast address.

When the communication apparatus 1 includes a plurality of radio interfaces 4, the communication apparatus 1 may participate in a plurality of multicast groups. In this case, a different multicast address is set to the individual radio interfaces 4.

Figure 6:
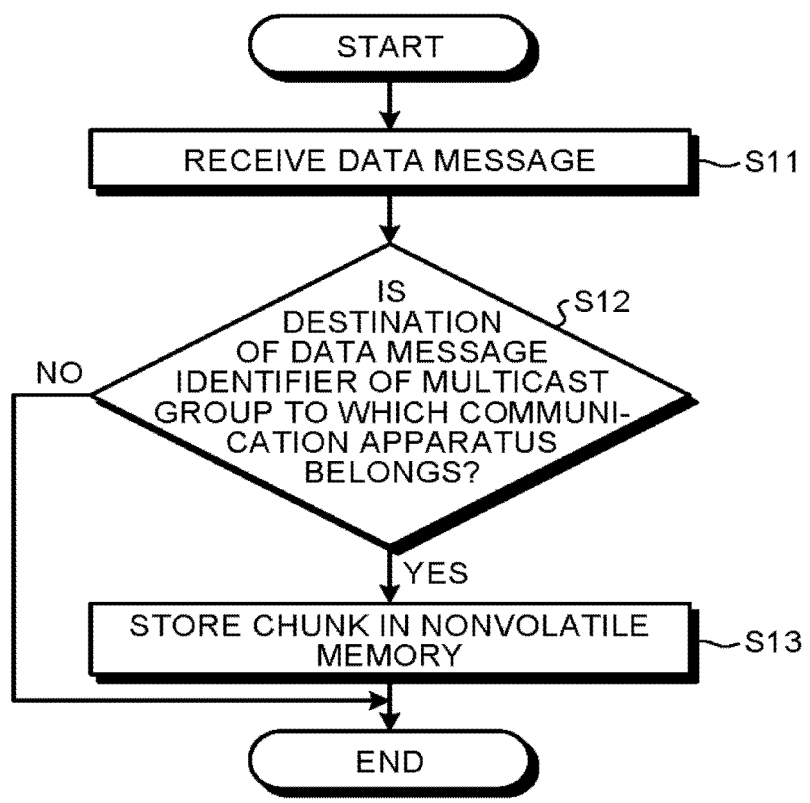
FIG. 6 is a flowchart illustrating an example of a determination procedure of mode switching.

The operations of the subscriber when the subscriber receives the data message from the publisher will be explained. FIG. 6 is a flowchart illustrating an example of the operations of the subscriber that receives the data message. When the subscriber receives the data message (step S11), the subscriber determines whether or not the destination of the data message is the identifier of the multicast group in which the communication apparatus 1 participates (step S12). When the destination of the data message is the identifier of the multicast group in which the communication apparatus 1 participates (step S12 Yes), the data message (specifically, the chunk stored in the data message) is stored in the nonvolatile memory 5 (step S13), and the process is terminated. The chunk included in the data message may be extracted on a RAM (not illustrated) without being stored in the nonvolatile memory 5, and a predetermined process may be performed to the extracted chunk in step S13. When the destination of the data message is not the identifier of the multicast group in which the communication apparatus 1 participates (step S12 No), the data message is not stored in the nonvolatile memory 5, and the process is terminated.

Figure 7:
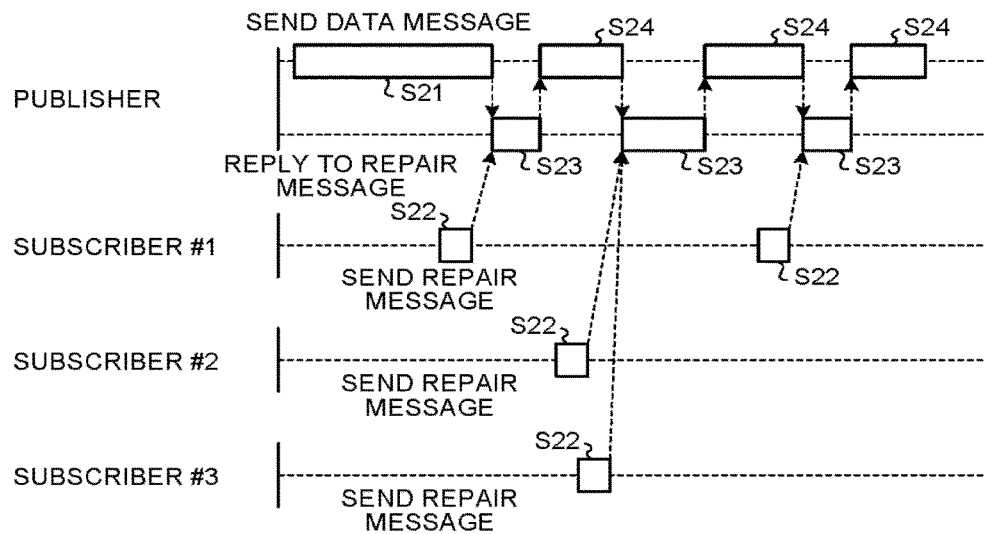
FIG. 7 is a diagram illustrating an example of a data message transmission sequence in a cycle transmission state of the first embodiment.

Next, a data message transmission sequence of the publisher will be explained. FIG. 7 is a diagram illustrating an example of the data message transmission sequence in cycle transmission state of the present embodiment. Here, to simplify the description, it is assumed that a new subscriber does not participates in the multicast group later. First, the publisher sequentially sends the ToC and a series of data messages (step S21). The series of data messages is, as described above, the data message that is the information of the file notified by the ToC, and a plurality of data messages storing the data of one or more files (chunks). Specifically, the file manager 22 decides the transmission order of the chunks to be sent, instructs the message processor 23 of the transmission order from the first to the last chunk, and the message processor 23 sequentially generates the data messages storing one or more chunks based on the transmission order. The radio interface 4 sends the generated data messages. In this manner, the state where the publisher sends the chunk corresponding to a ToC in the data message in the order from the first to the last chunk is referred as the cycle transmission state.

On the other hand, the subscriber receives the data message sent from the publisher, and sends the repair message when there is a chunk that the subscriber has failed to receive (step S22). Specifically, the file manager 22 of the subscriber compares the chunk list notified by the ToC with the chunk identifier of the correctly received chunk and determines whether or not there is a chunk that has not been correctly received. When there is a chunk that has not been correctly received, the identifier of the chunk is notified to the message processor 23, and the message processor 23 generates the repair message storing the notified identifier of the chunk. The radio interface 4 sends the generated repair message.

When the publisher receives the repair message in the cycle transmission state, the publisher suspends the operation to sequentially send the chunks and replies to the repair message (step S23). Specifically, the publisher sends the chunk corresponding to the identifier of the chunk included in the repair message with the data message. After the publisher responses to the repair message, the publisher resumes the suspended transmission of the series of data messages (step S24). In this manner, in response to the transmission of the repair message (step S22), the publisher repeats suspending the transmission of the series of data messages, replying to the repair message (step S23), and resuming the transmission (step S24).

Figure 8:
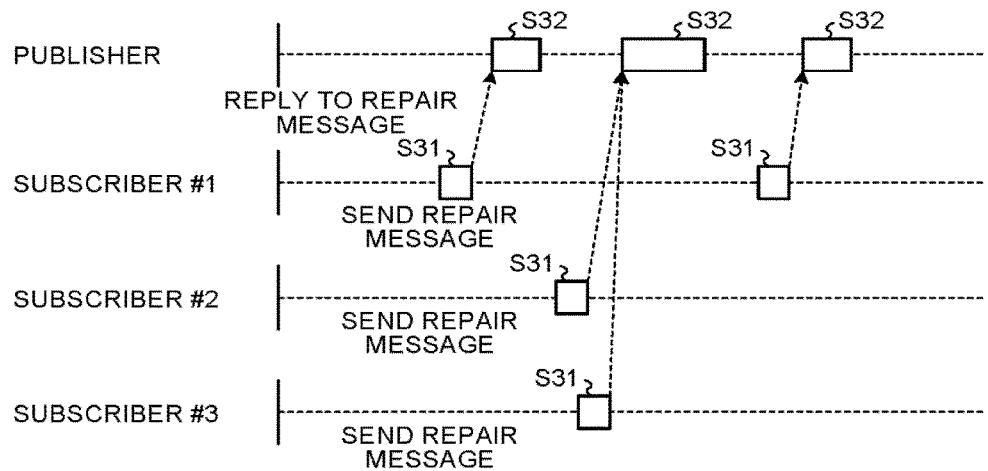
FIG. 8 is a diagram illustrating an example of a data message transmission sequence in a repair acceptance state of the first embodiment.

After the publisher sends the last chunk of the series of data messages, the publisher transits from the cycle transmission state to a repair acceptance state. FIG. 8 is a diagram illustrating an example of the data message transmission sequence in the repair acceptance state of the present embodiment. In the repair acceptance state, the publisher operates when the publisher receives the repair message. The subscriber sends the repair message when there is a chunk that the subscriber has failed to receive (step S31). When the publisher receives the repair message, the publisher responses to the repair message (step S32). Specifically, the publisher sends the chunk corresponding to the identifier of the chunk included in the repair message with the data message. The data message to be sent at this time may be sent via the multicast or the unicast. The publisher determines that the transmission has completed when the repair message does not reach the publisher for a predetermined period of time and terminates the repair acceptance state.

Although the example where the data message is sent in chunk unit has been described above, in the case of the repair message, the identifier of the chunk is stored even when the data message is sent in sector unit.

Next, a method for determining the timing when the subscriber sends the repair message and the chunk identifier included in the individual repair messages will be exemplified. The subscriber sorts, based on the information notified by the ToC, all chunks sent by the publisher so as to be the order that the chunks has been sent. Next, when the data message including the chunk that has not been received from the publisher does not reach the subscriber for a predetermined period of time from the time when the ToC is received, the subscriber determines that the subscriber has failed to receive the chunk and requests to resend the chunk by generating and sending the repair message. It is assumed that the chunks that the subscriber requests at this time are a predetermined number of chunks, which has not been received, selected in the order from the first in the sorted chunk list.

As described above, in the present embodiment, the publisher sends the data in chunk unit or sector unit via the multicast, and the subscriber sends, to the publisher, the repair message storing the identifier indicating the chunk or the sector determined that the chunk or the sector has not been correctly received. Then, the publisher resends the chunk or the sector specified by the repair message. Consequently, when the same data is sent to a plurality of subscribers, it is possible to send the data other than the data that the subscriber requests to resend in one transmission, and accelerate the communication and reduce the power consumption. Simultaneously, it is possible to resend the data that has not been correctly received and avoid the data from missing.

Next, the method for setting the transmission rate of the multicast communication of the present embodiment will be explained. As described above, the rate adaptation is performed in the unicast communication, and the information indicating the transmission rate is added in the header of the layer 1 or the layer 2 of the individual messages. The header of the layer 1 or the layer 2 is added to the data message and the repair message of the present embodiment by the radio interface 4, which is not illustrated in FIGS. 2 and 3. Since the repair message is sent via the unicast as described above, the rate information indicating the transmission rate (hereinafter, referred to as a best rate) optimized by the rate adaptation is stored in the repair message.

In the present embodiment, the MRS 24 of the publisher grasps the best rates of the individual subscribers by extracting the rate information stored in the header of the layer 1 or the layer 2 of the repair message received from the subscriber. Furthermore, the MRS 24 decides the transmission rate of the multicast transmission based on the best rates of the individual subscribers.

Figure 9:
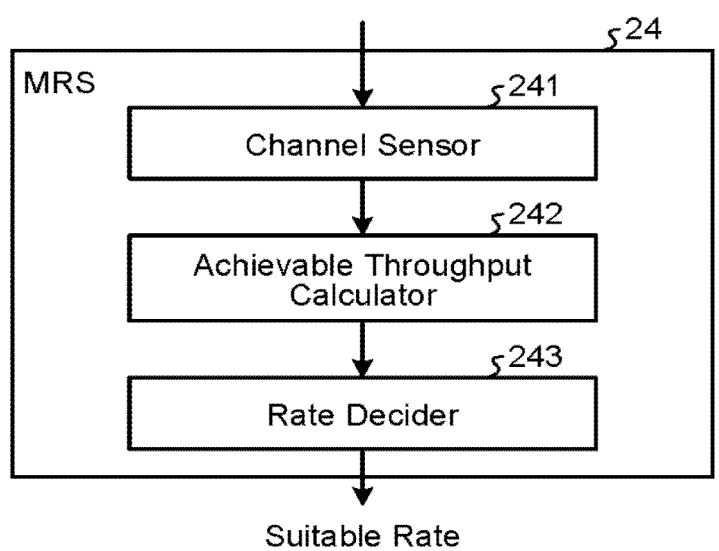
FIG. 9 is a diagram illustrating a configuration example of an MRS of the first embodiment.

FIG. 9 is a diagram illustrating a configuration example of the MRS 24 of the present embodiment. As illustrated in FIG. 9, the MRS 24 includes a channel sensor 241, an achievable throughput calculator 242, and a rate decider 243.

The channel sensor 241 determines whether or not the repair message has been received, and when the message has been received, the channel sensor 241 extracts the rate information from the repair message, associates the information indicating the transmission source stored in the repair message (the identifier of the subscriber as the transmission source) with the best rate indicated by the rate information, and holds the information as a subscriber rate information. Furthermore, when the best rate is updated, when the repair message has been received, or when the repair messages more than a predetermined number have been received, the channel sensor 241 outputs the held subscriber rate information to the achievable throughput calculator 242. Although an example, where the information in which the identifier of the subscriber as the transmission source is associated with the best rate indicated by the rate information is the subscriber rate information, will be explained in the description, the subscriber rate information may not include the identifier of the subscriber. For example, the subscriber rate information may be, for example, the list of the best rates of the individual subscribers.

The achievable throughput calculator 242 holds a rate-throughput table (RT-table). The achievable throughput calculator 242 calculates achievable throughput for the individual transmission rates based on the RT-table and the subscriber rate information. The RT-table is the table indicating effective throughput for individual pairs of the selected transmission rate, that is, the set transmission rate and the best rate of the subscriber. The achievable throughput is the value indicating the throughput to all of the subscribers which receive the message sent via the multicast set to the individual transmission rates.

FIG. 10 is a diagram illustrating an example of the RT-table of the present embodiment. Here, it is assumed that the number of transmission rates that the communication apparatus 1 can handle is k (k is an integer of two or more), and that the transmission rates $R_1, R_2, \ldots,$ and $R_k$ satisfy $R_i < R_j$ when $i < j$. Furthermore, i and j are integers of one or more and k or less. Moreover, Tm,n is defined as the effective throughput when the transmission is performed with $R_n$ that is set (selected) in the case where the best rate is $R_m$. Therefore, the RT-table is the table in which Tm,n corresponding to the transmission rate $R_n$ when the best rate $R_m$ is selected. The effective throughput Tm,n is also referred to as matching throughput when the best rate and the selected transmission rate are matched (m=n) and the state where the optimal best rate is selected (the state where the optimal performance is obtained). In the RT-table illustrated in FIG. 10, the best rate is indicated in a vertical direction, the selected transmission rate (selected rate) is indicated in a horizontal direction, and the corresponding effective throughput Tm,n is stored in the intersection point of the best rate $R_m$ and the selected transmission rate $R_n$.

When n is smaller than m, that is, when the transmission rate lower than the best rate is selected, the performance originally achieved cannot be obtained, and the effective throughput Tm,n becomes lower than the matching throughput. When n is larger than m, that is, when the transmission rate higher than the best rate is selected, a packet loss rate increases, and the effective throughput Tm,n becomes lower than the matching throughput.

The effective throughput stored in the RT-table is calculated in advance by theoretical calculation based on a round trip time (RTT) and a probability of the packet error. Alternatively, the effective throughput stored in the RT-table may be calculated in advance based on a simulation or a measurement by a testbed experiment.

The achievable throughput calculator 242 calculates, based on the best rates of the individual subscribers and the RT-table, the sum of the effective throughput of the subscribers for each selected rate as the achievable throughput and outputs the achievable throughput of the individual selected rates to the rate decider 243.

For example, it is assumed that there exist two subscribers that receive the data sent by the publisher via the multicast and that the best rates of these two subscribers are different. In this case, when the transmission rate is set based on the subscriber having a lower best rate and the multicast transmission is performed, the subscriber having a higher best rate receives the data with the transmission rate lower than the best rate, and the effective throughput becomes lower than the matching throughput. On the other hand, when the transmission rate is set based on the subscriber having a higher best rate and the multicast transmission is performed, a packet loss rate increases in the subscriber having a lower best rate, and the effective throughput becomes lower than the matching throughput. In this manner, when there exists a plurality of subscribers, how to select the transmission rate of the multicast transmission is a problem. In the present embodiment, the achievable throughput that is the sum of the effective throughput of the subscribers is used as an evaluation function to select the transmission rate of the multicast transmission.

The rate decider 243 selects, based on the achievable throughput calculated by the achievable throughput calculator 242, the transmission rate used for the multicast transmission and notifies the message processor 23 of the selected transmission rate. Specifically, the rate decider 243 selects the transmission rate so that the achievable throughput is largest.

Hereinafter, an example of a method for selecting the transmission rate of the multicast transmission in the communication apparatus 1 of the present embodiment will be explained. Here, it is assumed that the communication apparatus 1 of the present embodiment supports twelve transmission rates from $R_1$ to $R_{12}$. In the IEEE802.11 a/b/g, $R_1, R_2, R_3, R_4, R_5, R_6, R_7, R_8, R_9, R_{10}, R_{11},$ and $R_{12}$ are 1, 2, 5.5, 6, 9, 11, 12, 18, 24, 36, 48, and 54 Mbps respectively. The number of transmission rates that the communication apparatus 1 supports is not limited to twelve, and the values of the transmission rates that the communication apparatus 1 supports are not limited to the above examples.

Figure 11:
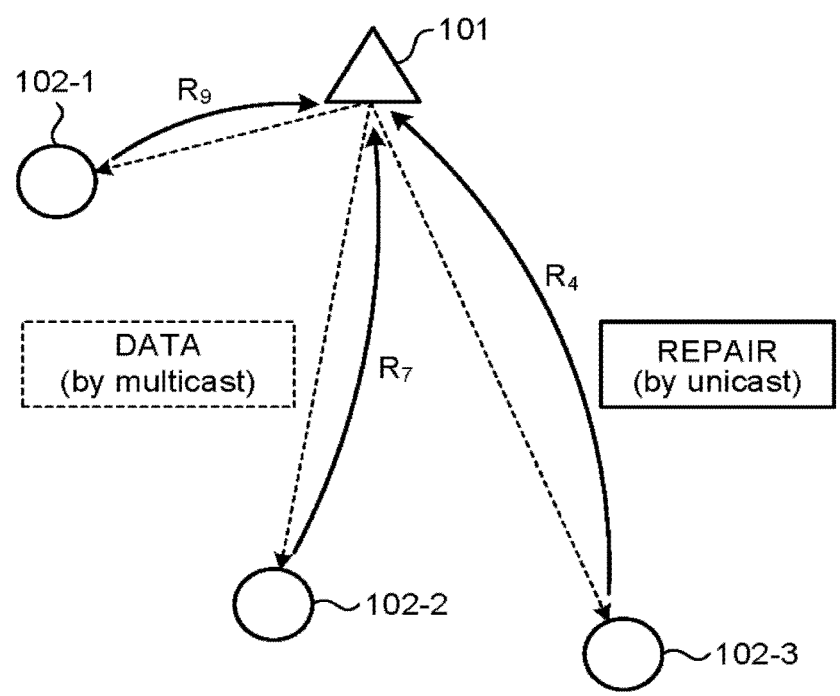
FIG. 11 is a diagram illustrating an example of the best rates of individual subscribers.

FIG. 11 is a diagram illustrating an example of the best rates of individual subscribers; The publisher 101 illustrated in FIG. 11 is the communication apparatus 1 that operates as the publisher, and subscribers 102-1 to 102-3 illustrated in FIG. 11 are the communication apparatuses 1 that operate as the subscribers. It is assumed that the publisher 101 distributes the data message via the multicast, and the subscribers 102-1, 102-2, and 102-3 send the repair message via the unicast. It is assumed that the repair messages sent by the subscribers 102-1, 102-2, and 102-3 include the information indicating $R_9$ (24 Mbps), $R_7$ (12 Mbps), and $R_4$ (6 Mbps) in the rate information respectively.

The channel sensor 241 grasps, based on the rate information stored in the repair messages received from the subscribers 102-1, 102-2, and 102-3, that the best rates of the subscribers 102-1, 102-2, and 102-3 are $R_9$, $R_7$, and $R_4$ respectively. Then, the channel sensor 241 associates the identifiers indicating the subscribers 102-1, 102-2, and 102-3 with $R_9$, $R_7$, and $R_4$ and outputs the associated information to the achievable throughput calculator 242 as the subscriber rate information.

The achievable throughput calculator 242 calculates, based on the best rates $R_9$, $R_7$, and $R_4$ of the subscribers 102-1, 102-2, and 102-3 and the RT-table, the achievable throughput for the individual selected rates. The achievable throughput is calculated for all of the settable transmission rates. In other words, when the achievable throughput corresponding to the selected rate $R_n$ is $A_n$, $A_1 = T_{4,1} + T_{7,1} + T_{9,1}$, $A_2 = T_{4,2} + T_{7,2} + T_{9,2}, \ldots, A_{12} = T_{4,12} + T_{7,12} + T_{9,12}$ are solved. The achievable throughput may not be calculated for the transmission rate lower than the minimum value among the best rates of the subscribers 102-1, 102-2, and 102-3 and the transmission rate higher than the maximum value among the best rates of the subscribers 102-1, 102-2, and 102-3.

The rate decider 243 calculates the maximum value in $A_1, A_2, \ldots, A_{12}$ that are calculated by the achievable throughput calculator 242 and the achievable throughput for the individual selected rates, and notifies the message processor 23 of the selected rate corresponding to the maximum value as the transmission rate used in the multicast transmission. As described above, in the present embodiment, the achievable throughput that is the sum of the effective throughput is used as the evaluation function, and the transmission rate used in the multicast transmission is selected. Thus, it is possible to set the appropriate transmission rate considering all of the subscribers.

Figure 12:
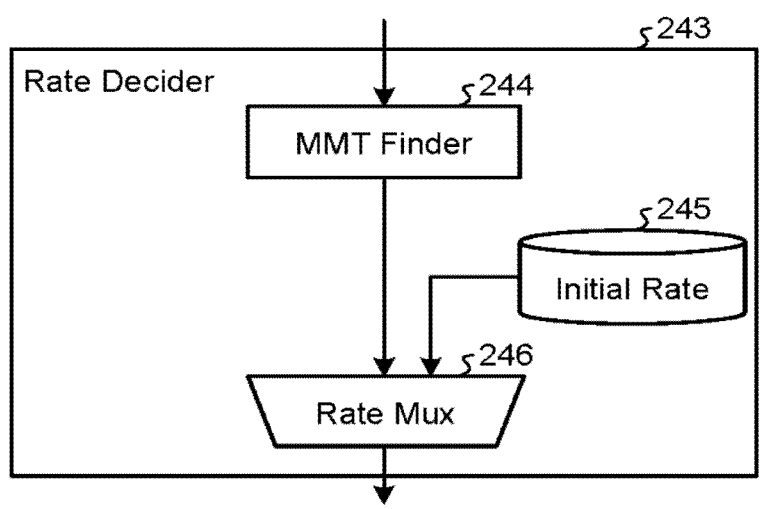
FIG. 12 is a diagram illustrating a configuration example of a rate decider of the first embodiment.

FIG. 12 is a diagram illustrating a configuration of the rate decider 243 of the present embodiment. The rate decider 243 includes a maximized multicast throughput (MMT) finder 244, an initial value (initial rate) storage unit 245, and a rate multiplexer (rate mux) 246. The MMT finder 244 calculates the MMT that is the maximum value among the achievable throughput and inputs the transmission rate corresponding to the MMT to the rate multiplexer 246. The initial value storage unit 245 stores the initial rate that is the initial value of the transmission rate set in advance and inputs the rate to the rate multiplexer 246. During the transmission rate corresponding to the MMT is not input from the MMT finder 244, that is, when the repair message has never been received, the rate multiplexer 246 outputs the initial value input from the initial value storage unit 245. When the transmission rate corresponding to the MMT is input from the MMT finder 244, the rate multiplexer 246 outputs the transmission rate corresponding to the MMT.

Figure 13:
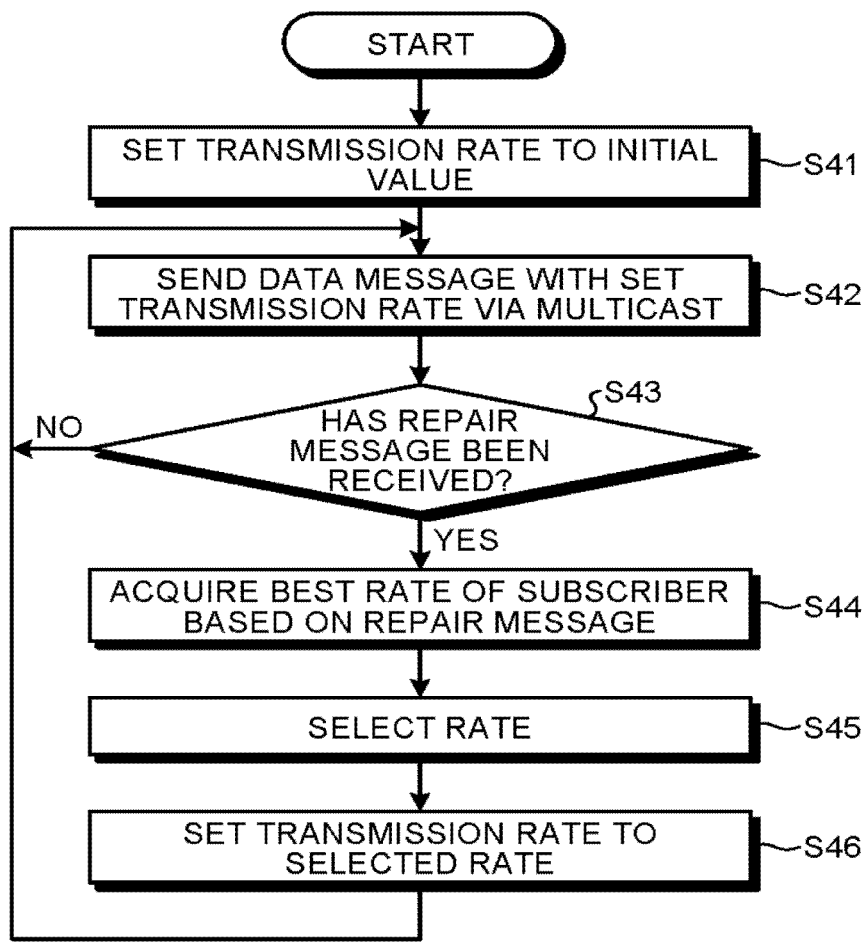
FIG. 13 is a flowchart illustrating an example of a decision procedure of a transmission rate of the first embodiment.

FIG. 13 is a flowchart illustrating an example of a decision procedure of a transmission rate of the present embodiment; First, the network control unit 2 sets the transmission rate (the transmission rate of the multicast transmission) to the initial value (initial rate) (step S41). Specifically, the MRS 24 outputs the initial rate to the message processor 23, and the message processor 23 sets the radio interface 4 so as to use the initial rate in the multicast transmission. An arbitrary transmission rate among the settable transmission rates can be set as the initial rate.

Next, the message processor 23 sends the data message with the set transmission rate via the multicast (step S42). Next, the channel sensor 241 of the MRS 24 determines whether or not the repair message has been received (step S43). When the repair message has been received (step S43 Yes), the channel sensor 241 of the MRS 24 acquires the best rate of the subscriber based on the repair message (step S44). Next, the MRS 24 performs a rate selection process (step S45). The rate selection process includes the above described calculation of the achievable throughput by the achievable throughput calculator 242 and the selection process of the transmission rate based on the achievable throughput by the rate decider 243.

After the rate selection process, the message processor 23 sets the transmission rate of the multicast transmission to the rate selected in the rate selection process (the transmission rate) (step S46), and the process returns to step S42. When the repair message has not been received in step S43 (step S43 No), the process returns to step S42.

The transmission rate may be selected every time the repair message has been received, when the repair message has been received a predetermined number of times, or when at least one of the best rates stored in the repair message has been changed.

The example, where the sum of the effective throughput of the subscribers is used as the evaluation function of the achievable throughput, has been explained as above. However, the method for selecting the transmission rate based on the best rates of the subscribers is not limited to the example where the evaluation function is used. For example, a method in which the publisher selects the minimum value among the best rates of the subscribers that have received the repair message, a method in which the publisher selects the maximum value among the best rates of the subscribers that have received the repair message, and a method in which the publisher selects the median of the maximum value and the minimum value among the best rates of the subscribers that have received the repair message may be used. In other words, as the details of the example of FIG. 11, in the method for selecting the minimum value, $A_1=\min\{T_{4,1}, T_{7,1}, T_{9,1}\}$, $A_2=\min\{T_{4,2}, T_{7,2}, T_{9,2}\}$, ..., $A_{12}=\min\{T_{4,12}, T_{7,12}, T_{9,12}\}$, in the method for selecting the maximum value, $A_1=\max\{T_{4,1}, T_{7,1}, T_{9,1}\}$, $A_2=\max\{T_{4,2}, T_{7,2}, T_{9,2}\}$, ..., $A_{12}=\max\{T_{4,12}, T_{7,12}, T_{9,12}\}$, and an example of the method for selecting the median, $A_1=\text{med}\{T_{4,1}, T_{7,1}, T_{9,1}\}$, $A_2=\text{med}\{T_{4,2}, T_{7,2}, T_{9,2}\}$, ..., $A_{12}=\text{med}\{T_{4,12}, T_{7,12}, T_{9,12}\}$. Here, min, max, and med are the functions to return the minimum value, the maximum value, the median respectively from the values in the braces. Furthermore, the method for selecting the sum, the minimum value, the maximum value, or the median among the effective throughput of a part of subscribers, instead of all subscribers, may be used. In the example of FIG. 11, the best rates of the three subscribers are $R_9$, $R_7$, and $R_4$. For example, the subscriber 102-3 having the smallest best rate is excluded from the calculation, and the achievable throughput is calculated as $A_1=T_{7,1}+T_{9,1}$, $A_2=T_{7,2}+T_{9,2}$, ..., $A_{12}=T_{7,12}+T_{9,12}$. As the method for selecting the subscriber to be excluded, it is considered the method in which Nmin of subscribers are excluded in an ascending order of the best rate, the method in which Nmax of subscribers are excluded in a descending order of the best rate, or the method in which both methods are combined. In this case, Nmin and Nmax may be fixed values, or may be determined in proportion of the number of subscribers, such as P % of the number of subscribers. Alternatively, by calculating the mean value or the median of the best rates of the subscribers, the subscriber having the best rate in which the difference from the calculated value is more than a threshold Rth may be excluded. In the example of FIG. 11, it is assumed that $Ravg=(R_9+R_7+R_4)/3$, $Rmed=\text{med}\{R_9, R_7, R_4\}$, when the best rate of a certain subscriber is Ri, if $|Ri-Ravg|>Rth$, the subscriber is excluded from the calculation. Alternatively, if $|Ri-Rmed|>Rth$, the subscriber is excluded from the calculation. In this manner, by excluding the subscriber having the best rate greatly different from the most subscribers, it is possible to give priority to the data transmission to the most subscribers. After the most subscribers receive the data, the transmission to the subscriber having a lower best rate and the transmission to the subscriber having a higher best rate may be performed individually.

Furthermore, although the publisher acquires the best rate using the repair message in the present embodiment, the publisher may acquire the best rate using the header of the layer 1 or the layer 2 of the data sent via the unicast other than the repair message. The transmission via the unicast includes the transmission via the multicast sent from the subscriber in the infrastructure mode as described above. For example, the publisher may send, to the subscriber, the message to request the response via the unicast and acquire the best rate using the response message from the subscriber.

As described above, in the present embodiment, the publisher that performs the multicast transmission acquires, based on the message sent from the subscriber via the unicast, such as the repair message, the best rate of the subscriber and selects the transmission rate of the multicast transmission based on the best rate. Consequently, it is possible to set the appropriate transmission rate considering all of the subscribers.

(Second Embodiment)

Next, a communication apparatus 1 according to a second embodiment will be explained. The configuration of the communication apparatus 1 of the present embodiment is similar to that of the first embodiment. Hereinafter, the different points from the first embodiment will be explained.

In the first embodiment, it has been described that the MRS 24 of the communication apparatus 1 that operates as the publisher sets the transmission rate of the multicast transmission to the initial rate before the repair message is received. Although the example where an arbitrary transmission rate among the settable transmission rates is set to the initial rate has been explained in the first embodiment, the maximum value among the settable transmission rates is set as the initial rate in the present embodiment. For example, when the above described twelve the transmission rates of $R_1$, $R_2$, $R_3$, $R_4$, $R_5$, $R_6$, $R_7$, $R_8$, $R_9$, $R_{10}$, $R_{11}$, and $R_{12}$ are settable, $R_{12}$ is set as the initial rate.

As described in the first embodiment, by deciding the transmission rate based on the repair message, the publisher can grasp the latest best rate based on the repair message when a transmission path state between the subscriber and the publisher is changed for the worse. For example, when the distance between the publisher and the subscriber becomes longer due to the movement of the subscriber, the transmission path state is worsened. Consequently, the best rate of the subscriber is lowered. Furthermore, since the transmission path state is worsened, the subscriber fails to receive the data message and sends the repair message.

On the other hand, when the data message is sent with the transmission rate lower than the best rate of the subscriber, the probability to send the repair message is decreased. Consequently, the publisher does not timely change the transmission rate of the multicast transmission. Although it is desired that the transmission rate is set higher as much as possible from the point of view of transmission efficiency, it is difficult to change the transmission rate to a higher rate with the method of the first embodiment.

Therefore, in the present embodiment, the highest transmission rate in the initial rate is set. Thus, the possibility that the repair message is sent from the subscriber is increased, and it is possible to increase the possibility that the appropriate transmission rate is selected.

(Third Embodiment)

Figure 14:
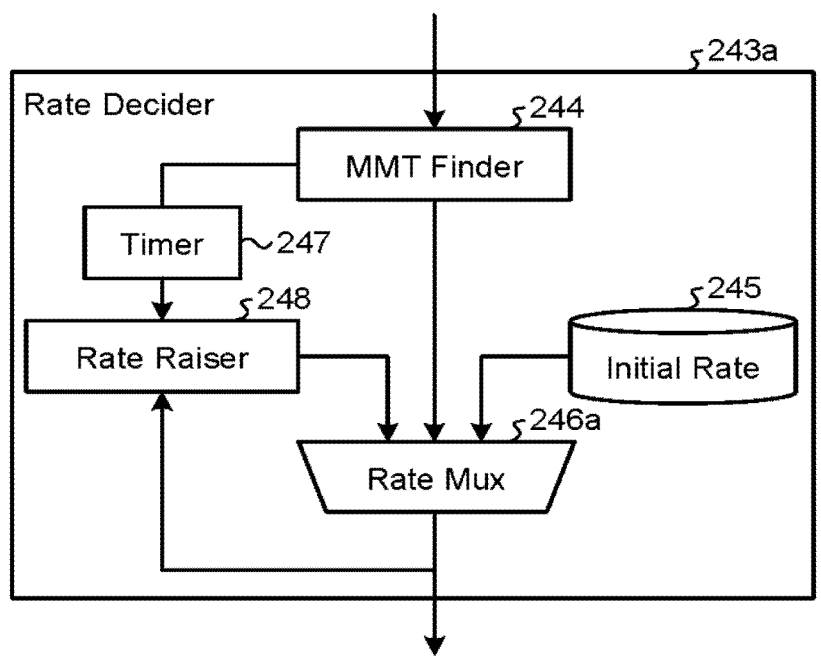
FIG. 14 is a diagram illustrating a configuration example of a rate decider of a third embodiment.

Next, a communication apparatus according to a third embodiment will be explained. FIG. 14 is a diagram illustrating a configuration of a rate decider 243a of the present embodiment. The communication apparatus of the present embodiment is similar to the communication apparatus 1 of the first embodiment except that the rate decider 243a is included instead of the rate decider 243. Hereinafter, the different points from the first embodiment will be explained.

As described in the second embodiment, it is difficult to change the transmission rate to a higher rate with the method of the first embodiment. Consequently, in the present embodiment, the rate decider 243a periodically sets the transmission rate of the multicast transmission to a higher transmission rate. Although an example where the rate decider 243a sets the transmission rate one-stage higher than the current transmission rate set periodically will be explained, the highest transmission rate may be periodically set. Alternatively, the rate decider 243a may periodically set the intermediate transmission rate between the highest transmission rate and the transmission rate set currently.

As illustrated in FIG. 14, the rate decider 243a is similar to the rate decider 243 of the first embodiment except that a timer 247 and a rate raiser 248 are added to the rate decider 243 of the first embodiment and that a rate mux 246a is included instead of the rate mux 246. The timer 247 measures a predetermined period of time and notifies the rate raiser 248 of the timer expiration when a predetermined period of time has passed. When the rate raiser 248 is notified of the timer expiration by the timer 247, the rate raiser 248 outputs, to the rate mux 246a, the transmission rate one-stage higher than the value previously set to the transmission rate (the latest value notified by the rate mux 246a). When the transmission rate has been input from the rate raiser 248, the rate mux 246a outputs the transmission rate input from the rate raiser 248. When the transmission rate has been input not from the rate raiser 248 but from the MMT finder 244, the rate mux 246a outputs the transmission rate input from the MMT finder 244. When the transmission rate has never been input from the rate raiser 248 and the MMT finder 244, the rate mux 246a outputs the initial rate input from the initial value storage unit 245. Furthermore, the rate mux 246a notifies the rate raiser 248 of the output transmission rate.

Figure 15:
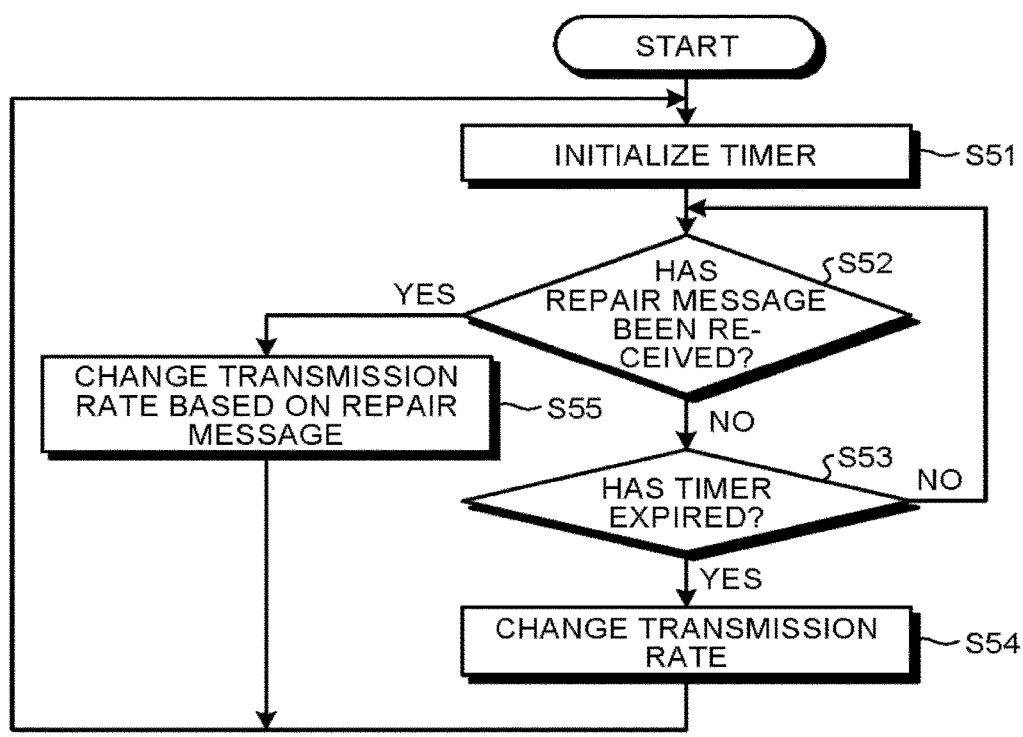
FIG. 15 is a diagram illustrating an example of a transmission rate change process procedure in the rate decider of the third embodiment.

FIG. 15 is a diagram illustrating an example of a transmission rate change process procedure at the rate decider 243a of the present embodiment. At the rate decider 243a, first, the MMT finder 244 initializes the timer 247 (step S51). The MMT finder 244 determines whether or not the repair message has been received (step S52). When the repair message has been received (step S52 Yes), the MMT finder 244 changes the transmission rate of the multicast transmission based on the repair message (step S55), and the process returns to step S51. It is assumed that the achievable throughput calculator 242 performs the process every time the repair message is received and that the MMT finder 244 grasps that the repair message has been received by inputting the data from the achievable throughput calculator 242. In the case where the achievable throughput calculator 242 performs the process, for example, when the repair message is received a fixed number of times, the message processor 23 may notify the MMT finder 244 whether or not the repair message has been received. When the repair message has not been received (step S52 No), the timer 247 has expired (step S53 Yes), and the rate raiser 248 outputs, to the rate mux 246a, the transmission rate one-stage higher than the transmission rate set currently. The transmission rate of the multicast transmission is thereby changed (step S54), and the process returns to step S51. When the timer 247 has not expired (step S53 No), the process returns to step S52.

With the above processes, when the repair message has not been sent from any subscriber for a predetermined period of time, the publisher changes the transmission rate of the multicast transmission to the one-stage higher rate. After the transmission rate of the multicast transmission is changed to the one-stage higher rate, when the repair message is sent from the subscriber, the appropriate transmission rate is reselected based on the best rates of the individual subscribers by the method described in the first embodiment. Furthermore, after the transmission rate of the multicast transmission is changed to the one-stage higher rate, when the repair message has not been received for a predetermined period of time, the transmission rate of the multicast transmission is further changed to another one-stage higher rate. With the above described processes, even when the best rates of the individual subscribers become high, it is possible to appropriately set the transmission rate of the multicast transmission.

As described above, the transmission rate of the multicast transmission is periodically changed to a value higher than the value currently set in the present embodiment. Thus, even when the best rate between the publisher and the subscriber is changed to a higher rate, it is possible to appropriately set the transmission rate of the multicast transmission.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus which sends a data message to a plurality of receivers comprising:
   a radio interface that performs rate adaptation with each of the plurality of receivers according to communication protocol of physical layer or data link layer, receives a plurality of messages from the plurality of receivers respectively, and extracts a plurality of rate information from the plurality of messages respectively, each of the rate information indicating a transmission rate selected by the rate adaptation between the communication apparatus and each of the plurality of receivers;
   a processor configured to:
   generate the data message, in which a multicast identifier indicating a multicast group is a destination, and outputs the data message to the radio interface; and
   hold an estimated effective throughput table which includes estimated effective throughputs for each pairs of one of first transmission rates and one of second transmission rates, the first transmission rates being candidates for a data message transmission rate to send the data message, the second transmission rates being candidates for the transmission rate selected by the rate adaptation, obtain a plurality of sets of a plurality of estimated effective throughputs based on the estimated effective throughput table and the plurality of rate information, the plurality of sets respectively corresponding to each of the first transmission rates, and select, according to the plurality of sets, the data message transmission rate from the first transmission rates.

2. The communication apparatus according to claim 1, wherein the received message is a repair message sent from the receiver to request to resend the data message.

3. The communication apparatus according to claim 1, wherein the plurality of effective throughputs included in one of the plurality of sets respectively correspond to the plurality of receivers, and
   wherein the data message transmission rate is selected according to aggregate throughputs respectively corresponding to the first transmission rates in which the plurality of effective throughputs included in one of the plurality of sets are aggregated.

4. The communication apparatus according to claim 3, wherein each of the aggregate throughputs is a sum of the plurality of effective throughputs.

5. The communication apparatus according to claim 3, wherein each of the aggregate throughputs is a maximum value of the plurality of effective throughputs.

6. The communication apparatus according to claim 1, wherein before the message is received from the one or more among the plurality of receivers, the processor sets the data message transmission rate to the highest rate among settable transmission rates.

7. The communication apparatus according to claim 1, wherein when a predetermined period of time has passed after receiving first messages, the first messages being the plurality of messages from the plurality of receivers without receiving any second messages from the plurality of receivers, each of the second message including the rate information corresponding to one of the plurality of receivers from, the processor changes the data message transmission rate to a higher value than a currently selected value.

8. The communication apparatus according to claim 1, wherein when a predetermined period of time has passed after receiving first messages, the first messages being the plurality of messages from the plurality of receivers without receiving any second messages from the plurality of receivers, each of the second message including the rate information corresponding to one of the plurality of receivers the processor changes the data message transmission rate to the highest transmission rate among settable transmission rates.

9. The communication apparatus according to claim 1, wherein algorithm of the rate adaptation is automatic rate fallback algorithm.

10. A communication method sending a data message to a plurality of receivers comprising:
    performing rate adaptation with each of the plurality of receivers according to communication protocol of physical layer or data link layer, receiving a plurality of messages from the plurality of receivers respectively;
    extracting a plurality of rate information from the plurality of messages respectively, each of the rate information indicating a transmission rate selected by the rate adaptation between the communication apparatus and each of the plurality of receivers;
    holding an estimated effective throughput table which includes estimated effective throughputs for each pairs of one of first transmission rates and one of second transmission rates, the first transmission rates being candidates for a data message transmission rate to send the data message, the second transmission rates being candidates for the transmission rate selected by the rate adaptation;
    obtaining a plurality of sets of a plurality of estimated effective throughputs based on the estimated effective throughput table and the plurality of rate information, the plurality of sets respectively corresponding to each of the first transmission rates; and
    selecting, according to the plurality of sets, the data message transmission rate from the first transmission rates.

11. The communication method according to claim 10, wherein the plurality of messages are repair messages sent from the plurality of receivers to request to reseed the data message.

12. The communication method according to claim 10, the plurality of effective throughputs included in one of the plurality of sets respectively correspond to the plurality of receivers, and
    wherein the data message transmission rate is selected according to aggregate throughputs respectively corresponding to the first transmission rates in which the plurality of effective throughputs included in one of the plurality of sets are aggregated.

13. The communication method according to claim 12, wherein each of the aggregate throughputs is a sum of the plurality of effective throughputs.

14. The communication method according to claim 12, wherein each of the aggregate throughputs is a maximum value of the plurality of effective throughputs.

15. The communication method according to claim 10, further comprising:
    setting, before the message is received from the one or more among the plurality of receivers, the data message transmission rate to the highest transmission rate among settable transmission rates.

16. The communication method according to claim 10, further comprising:

changing, when a predetermined period of time has passed after receiving first messages, the first messages being the plurality of messages from the plurality of receivers without receiving any second messages from the plurality of receivers, each of the second message including the rate information corresponding to one of the plurality of receivers from, the data message transmission rate to a higher value than a currently selected value.

17. The communication method according to claim 10, further comprising:

changing, when a predetermined period of time has passed after receiving first messages, the first messages being the plurality of messages from the plurality of receivers without receiving any second messages from the plurality of receivers, each of the second message including the rate information corresponding to one of the plurality of receivers, the data message transmission rate to the highest transmission rate among settable transmission rates.

18. The communication method according to claim 10, wherein algorithm of the rate adaptation is automatic rate fallback algorithm.

* * * * *